United States Patent [19]

Cavanaugh et al.

[11] Patent Number: 5,363,264
[45] Date of Patent: Nov. 8, 1994

[54] VERSATILE DIGITAL RECORDING SYSTEM FOR RECORDING HIGH RESOLUTION VIDEO IMAGERY

[75] Inventors: David B. Cavanaugh, San Diego; Warren M. Goldberg, both of San Diego, Calif.

[73] Assignee: The United States of America as represented by the Secretary of the Navy, Washington, D.C.

[21] Appl. No.: 988,377

[22] Filed: Dec. 7, 1992

Related U.S. Application Data

[63] Continuation of Ser. No. 514,079, Apr. 25, 1990, abandoned.

[51] Int. Cl.5 .............................................. H04N 5/78
[52] U.S. Cl. ................................ 360/11.1; 360/33.1; 358/313; 358/335
[58] Field of Search ................ 360/11.1, 35.1, 33.1, 360/9.1, 61; 358/313, 335

[56] References Cited

U.S. PATENT DOCUMENTS

| | | | |
|---|---|---|---|
| 4,142,209 | 2/1979 | Hedlund et al. | 369/44.27 X |
| 4,392,159 | 7/1983 | Lemoine et al. | 358/319 |
| 4,549,201 | 10/1985 | Tanaka et al. | 358/13 |
| 4,638,381 | 1/1987 | Vaughn | 360/51 |
| 4,651,227 | 3/1987 | Yunoki et al. | 358/310 |
| 4,685,003 | 8/1987 | Westland | 360/14.1 |
| 4,734,901 | 3/1988 | Murakami | 369/59 |
| 4,774,599 | 9/1988 | Baumeister | 360/11.1 |

Primary Examiner—Andrew L. Sniezek
Attorney, Agent, or Firm—Harvey Fendelman; Thomas Glenn Keough

[57] ABSTRACT

A digital recording system contained in each video frame in memory at a write rate equal to that of a video imager from which the system receives the information. The system then outputs the information from memory to a recorder at a read rate which can be below the write rate and maximum recorder rate. The system outputs information from memory at the lower read rate by skipping a specific number of entire video frames and outputting the video frames between those skipped. The read rate is selected so that it provides a continuous stream of data to the recorder with only short gaps between video fields.

19 Claims, 5 Drawing Sheets

VERSATILE DIGITAL RECORDING SYSTEM FOR RECORDING HIGH RESOLUTION VIDEO IMAGERY

STATEMENT OF GOVERNMENT INTEREST

The invention described herein may be manufactured and used by or for the Government of the United States of America for governmental purposes without the payment of any royalties thereon or therefor.

This is a continuation of application Ser. No. 07/514,079, filed Apr. 25, 1990, now abandoned.

BACKGROUND OF THE INVENTION

The present invention generally relates to video recording systems and, more particularly, to a versatile digital recording system for recording high resolution video imagery.

Video imagers, i.e., cameras, employing the raster scanning technique are in widespread use ranging from broadcasting to infrared imaging. The raster scanning technique is versatile because it allows imagery to be transmitted at high rates with a single signal channel. The bandwidth of the signal from such a video imager is determined by the number of raster lines that are contained in a video frame. The typical low resolution TV broadcast 525 lines per frame format has a signal band-width of about 5 MHz. The high resolution 1024 lines per frame format has a bandwidth of 17 MHz.

Video imagery that generate imagery with such high or fine resolution of detail are expected to be used with increasing frequency in the future for specialized imaging applications in both military and commercial fields. The common unit used for recording raster scanned video is the analog video recorder (for example, a video cassette recorder, or VCR). Analog recorders are fundamentally limited in bandwidth to less than 6 MHz which is acceptable for recording low resolution imagery, such as standard broadcast 525 lines per frame TV signals. Analog tape recorders are unable to record signals at frequencies higher than this limit due to the inductive nature of magnetic recording heads and the grain size of the magnetic particles on the tape. Video formats with a higher signal bandwidth than 6 MHz cannot be recorded with good fidelity by analog recording systems.

Thus, if an imager's signal exceeds this limit, the resolution of detail in the image will be degraded in the record/reproduce process. Such is the case in a video imager which employs the high resolution 1024 lines per frame format. As explained above, due to bandwidth limitations analog recorders cannot be used for recording high resolution video. Digital recording is an alternative to analog recording which is not subject to the same limitations in bandwidth as analog recording.

Two factors are required to specify the resolution achievable with a digital recording system: (1) the temporal sampling frequency, and (2) the grey shade resolution. The temporal frequency determines the spatial resolution of the image, i.e., the more samples taken per video line the higher the resolution, provided the intrinsic resolution limits of the camera are not exceeded. The temporally sampled units are referred to as pixels, where each pixel is represented by a series of digital bits, known as a word. The maximum sampling rate achievable by an analog-to-digital converter is limited by the pixel word size. In the recent past, for a 10-bit pixel the maximum rate was 40 MHz. This rate represents the upper limit to the bandwidth of a digital recording system. For smaller word sizes the maximum sampling rate is higher, and for larger words the sampling rate is lower than 40 MHz.

The number of grey shades that can be represented by a pixel consisting of b bits is $2^b$. Thus, a 10-bit pixel contains $2^{10} = 1024$ steps in its dynamic range. For instance, in a thermal imaging system which has a thermal contrast range of T=40 (i.e. in the image a 0° C. target appears black and a 40° C. target appears white) the smallest thermal contrast that can be measured from the digital data is 40/1024=0.039° C. This is on the order of the minimum resolvable temperature difference (MRTD) of most high quality thermal imaging systems.

Digital recording systems can record video information with a higher bandwidth than analog systems. A digital recorder is capable of recording the imagery from a high resolution imager with full image fidelity. Also, the digital format is compatible with image processing facilities and eliminates the intermediate analog to digital conversion process that is necessary to analyze imagery from an analog recording in an image processor.

However, digital information takes up more space on recording tape than analog information. The temporal rate that information can be recorded on tape thus becomes the important limiting factor in recording high speed video information in digital format. The maximum rate for recording digital information with a tape recorder is determined by the tape drive speed and the packing density of digital bits on the tape. At present, the maximum speed at which a tape can be driven while maintaining precise control of the speed is below 180 inches per second. The maximum density of digital data that can be recorded on tape is $33.33 \times 10^3$ bits per inch per track. This gives a data rate of 6 Megabits per second per track. For a 24 track recording system the maximum data rate is thus 144 Megabits per second.

The rate at which digitized video information is generated depends on the resolution of the imager. Resolution is usually measured by the number of lines per frame that the imager generates. Video imagers which adhere to the EIA RS-170 or RS-330 NTSC video formats generate video frames at the rate of 30 frames per second, regardless of the resolution of the imager. Thus, the higher the resolution of an imager, the more rapidly information is generated. A single 525 lines per frame video frame is made up of $3.149 \times 10^5$ picture elements (pixels). At 30 frames per second this corresponds to a data rate of $9.45 \times 10^6$ pixels per second. In a video recording system where each pixel is represented by a 10 bit-word, the data rate from a 525 line imager is thus 94.5 Megabits per second. An equivalent analysis for a 1024 lines per frame image yields a data rate of 319.49 Megabits per second. The 525 lines per frame information could be recorded directly onto the tape since the data rate is below the maximum data rate of the recorder. The 1024 lines per frame information exceeds the maximum rate of the recorder (144 Megabits per second) by a factor of more than two.

Since high resolution imagers generate information at rates higher than 144 Megabits per second, there exists a need for a digital recording system that is capable of preserving the integrity of that information throughout the recording and reproduction processes and, at the same time, slowing the data rate to the recording system.

SUMMARY OF THE INVENTION

The present invention relates to a digital recording system which satisfactorily meets the aforementioned need by limiting the data stream to rates that are within the limitations of a conventional tape recorder, while providing the features and capabilities that meet the purposes of the system. The data rate is decreased by selectively eliminating some of the information from the data stream. However, rather than eliminating pixels from within each video frame which would degrade the image, the digital recording system of the present invention permits skipping a specific number of entire video frames and recording the video frames between those skipped in order to decrease the rate of the data stream to below the maximum data rate of the conventional tape recorder.

The digital recording system stores the video information contained in each frame in memory at a rate equal to the video rate of the imager. The digital recording system then reads the information from memory to the tape recorder at a slower rate which is always less than 144 Megabits per second, the maximum recorder rate. The output rate is selected so that it provides a continuous stream of data to the recorder with only short gaps between video fields.

OBJECTS OF THE INVENTION

Accordingly, it is the primary object of the present invention to disclose a digital recording system which is capable of recording high resolution video imagery in digital format on conventional magnetic recording tape.

Another object of the present invention is to disclose a digital recording system which records video images with a high signal bandwidth up to 20 MHz.

Still another object of the present invention is to disclose a digital recording system which will digitize and store single frames of video with a selectable number of unrecorded single frames occurring between the recorded frames so as to slow the data stream to a rate under the inherent bandwidth limitation of magnetic tape recorders.

A further object of the present invention is to disclose a digital recording system which records the video images in a digital format compatible with digital image processing systems.

A still further object of the present invention is to disclose a digital recording system which records a variety of video formats.

Other objects, advantages and novel features of the invention will become apparent from the following detailed description of the invention when considered in conjunction with the accompanying drawings.

DETAILED DESCRIPTION OF THE INVENTION

Digital Recording System—Overview

Figure 1:
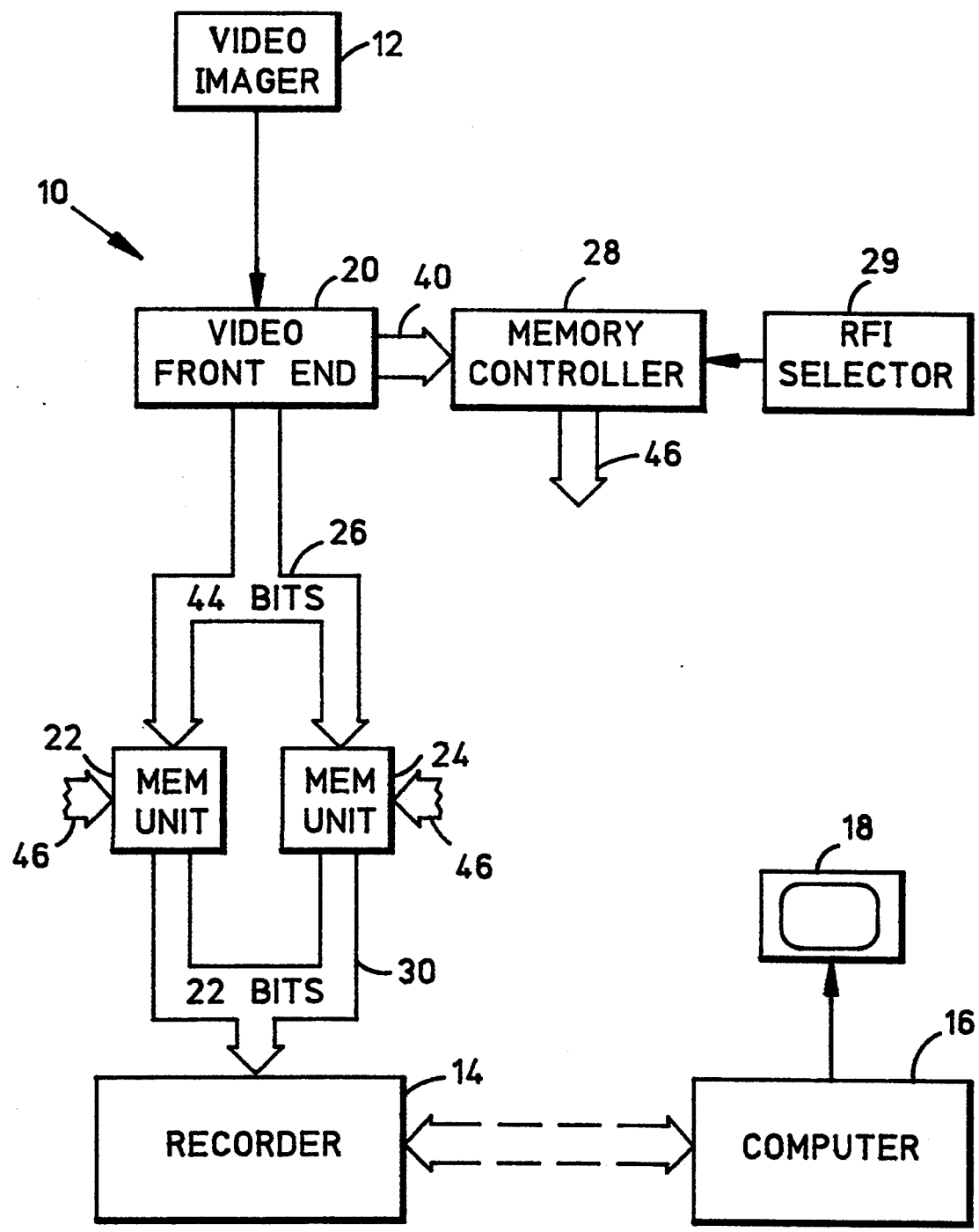
FIG. 1 is a general block diagram of the digital recording system of the present invention interfaced with a conventional magnetic tape recorder and a conventional computer.

Referring now to the drawings, and particularly to FIG. 1, there is shown, in general block diagram form, a digital recording system (DRS) 10 of the present invention interfaced on the input side with a conventional video source or imager 12 and on the output side with a tape recorder 14, a computer 16 and a video display terminal 18. Tape recorder 14 can be a high bit rate digital tape recorder of Ampex Corporation marketed under the designation HBR-3000i. Computer 16 can be an IBM-AT computer of IBM Corporation. Video display terminal 18 can be the Revolution Graphics Series of Number Nine Computer Inc.

DRS 10 is designed for capturing high resolution video imagery. The objective is to record single frame images which contain as much image detail as the imager 12 can provide. Image resolution of DRS 10 should be no less than the resolution of imager 12. In other words, imager 12, and not DRS 10, should be the element of the optical data gathering system which limits the resolution of the images. This objective can be satisfied in the 525 lines per frame format using a conventional high performance VCR having a recording bandwidth of around 5 MHz. However, there is now a desire to record higher resolution formats. A VCR is not suitable due to its fundamental bandwidth limitation.

DRS 10 is designed to record these higher bandwidth signals by artificially raising the recording bandwidth with digital techniques. This is accomplished by the present invention wherein images between the recorded images are skipped (i.e. not recorded). This allows a reduction in the data rate to the tape recorder 14 to one that the recorder can handle. The number of images that must be skipped to maintain an acceptable data rate is thus a function of the imager's resolution. A high resolution imager 12 which generates pixels at a high rate requires a larger number of skipped frames between recorded frames than would a lower resolution imager. With the present state of the art in magnetic recorders this tradeoff is not very severe. A 525 lines per frame image can be recorded at the full 30 Hz frame rate. An 875 lines per frame imager requires that a minimum of two frames be skipped for every recorded frame. A 1024 lines per frame imager requires that a minimum of three frames be skipped for every recorded frame.

The basic mode of operation of DRS 10 is to digitize and store single frames of video. To accommodate the inherent bandwidth limitations of the recorder 14, DRS 10 has the capability of recording a fraction of the video frames generated by imager 12. The recorded frames are captured with a selectable number of unrecorded frames occurring between recorded frames. The recorded frame interval (RFI) is defined as the total number of frames generated by the imager 12 for every frame that is recorded by DRS 10. Each video frame is temporarily stored in a digital memory, then read into the recorder 14 at a rate that is less than or equal to the maximum data rate of the recorder.

Recorder 14 is able to keep pace with the full information rate from a 525 lines per frame imager. Thus, the minimum RFI for this format is equal to 1, so that every frame may be recorded. The RFI may be set at a higher value which would conserve tape and limit the number of redundant images taken from a slowly varying scene.

The range of RFI selection for the 525 lines per frame format is: 1,2,4, ..., 128. For the higher line densities the full information rate from the imager exceeds the recorder bandwidth. A number of frames therefore pass unrecorded while a recorded frame is transferred from the memory into the recorder. The minimum RFI for the 875 lines per frame format is equal to two, and the selectable RFI range is: 2,4,8, ..., 256. The minimum RFI for the 1024 lines per frame format is equal to three, and the selectable RFI range is: 3,6,12, ..., 384. The manner in which the selectable RFI range is calculated for the different formats will be described later on.

The recorded data is labelled on the tape by "headers" which label the top of each new section of data. The headers precede each horizontal line and the start of each even and odd field. The headers contain line numbering information, the number of recorded frames on the tape, the RFI index, and the time of day. The header words replace the sync intervals and occupy less space on the tape than the sync intervals would if they were recorded.

DRS 10 is designed to accommodate a broad variety of composite video sources and can record either monochrome or color imagery. Computer 16, such as the IBM-AT computer, interfaced to DRS 10 is an efficient means for tape reduction. This computer can be interfaced to a mainframe image processing system for processing selected images on a higher power processor.

Digital Recording System—Detailed Description

Figure 2A:
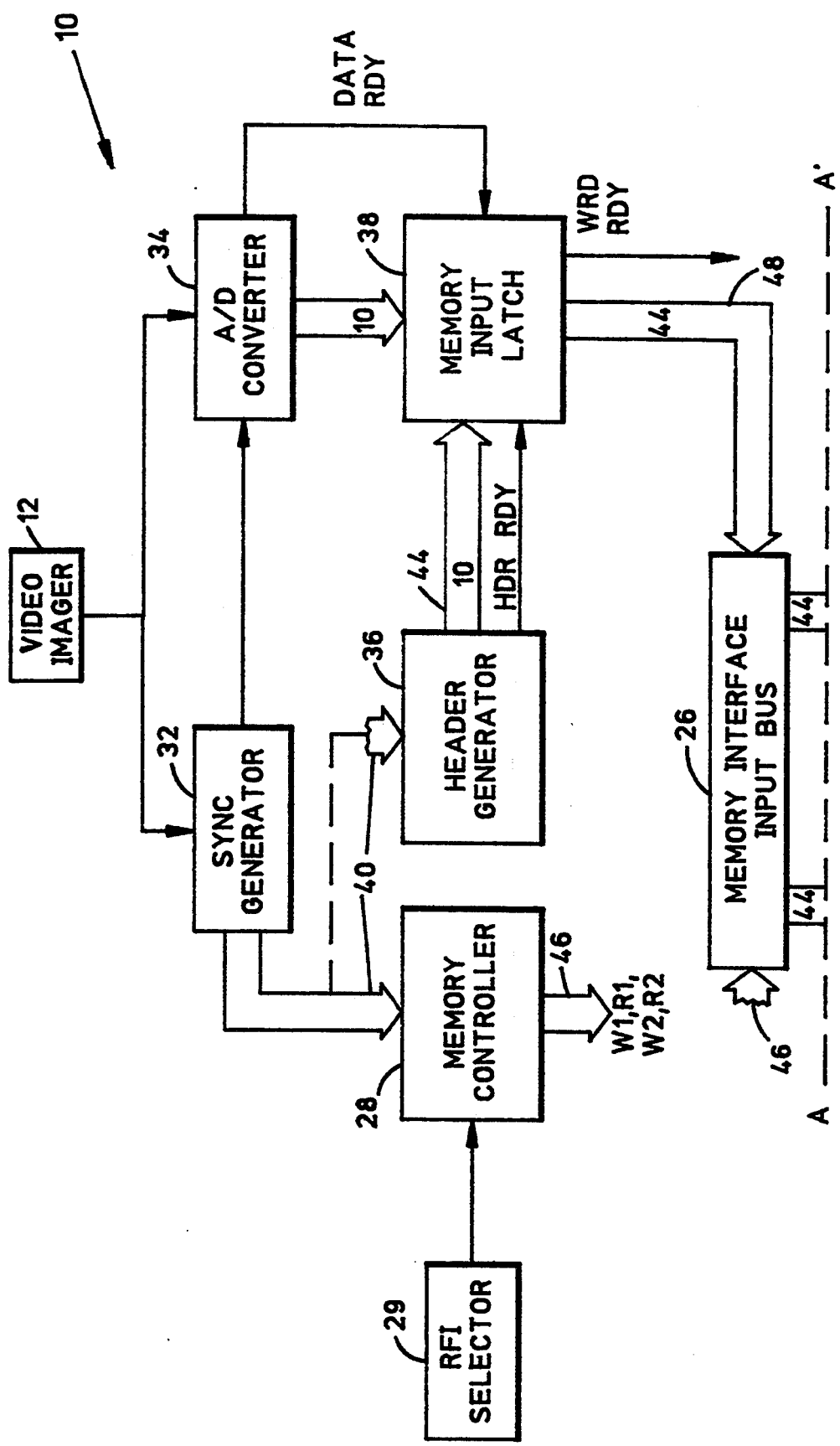
FIGS. 2A and 2B taken together provide a detailed block diagram of the digital recording system of FIG. 1.
Figure 2B:
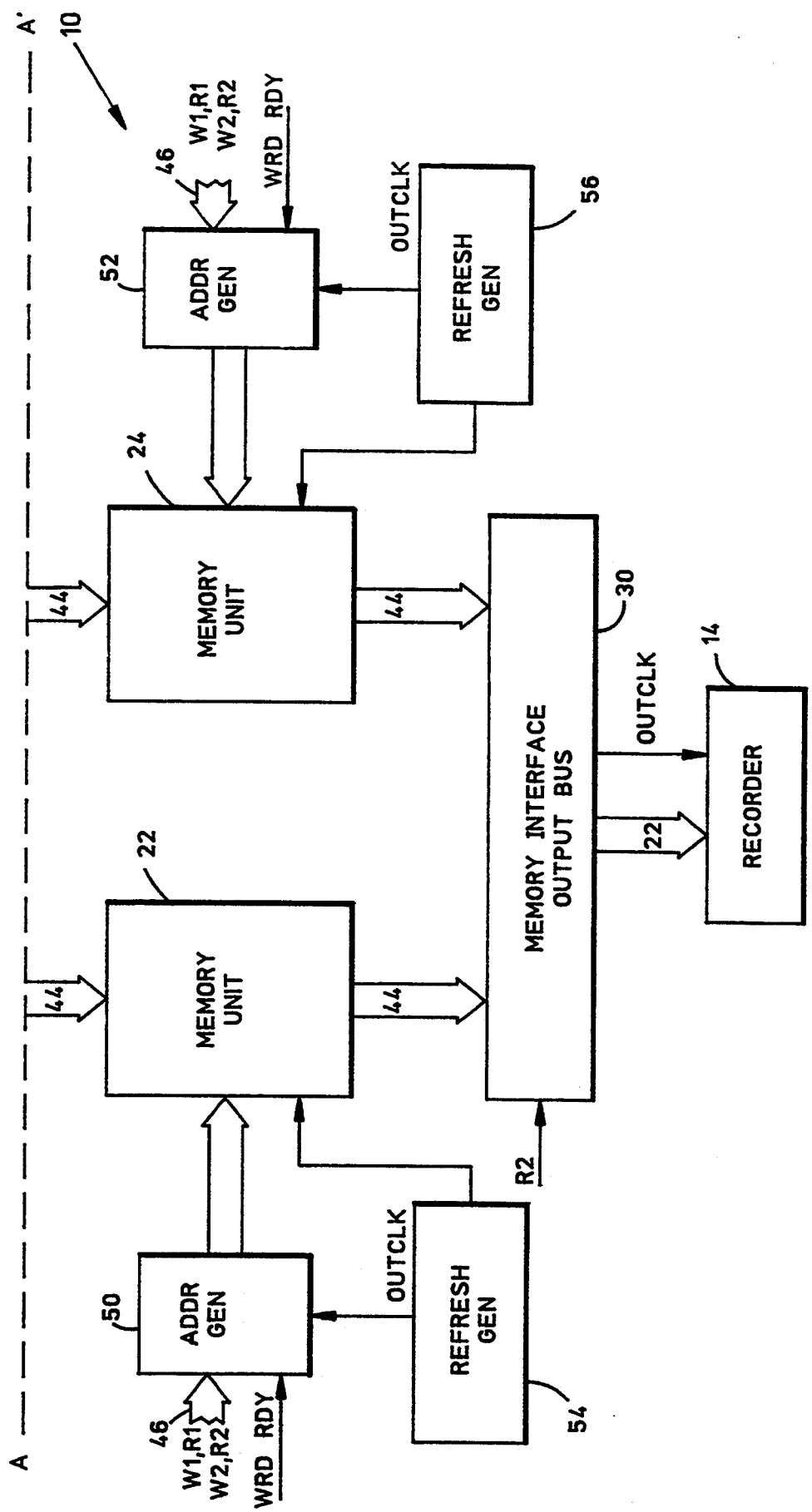

As seen in FIG. 1, DRS 10 generally includes video front end 20, memory units 22 and 24, memory interface input bus 26 between video front end 20 and memory units 22 and 24, memory controller 28 between video front end 20 and memory units 22 and 24, RFI selector 29 connected to memory controller 28, and memory interface output bus 30 between memory units 22 and 24 and recorder 14. Referring to FIGS. 2A and 2B, video front end 20 of DRS 10 encompass sync separator 32, analog-to-digital (A/D) converter 34, header generator 36 and memory input latch 38. DRS 10 is represented in block diagram form in FIGS. 1 and 2 since, except for sync separator 32, all of its components individually (but not in the disclosed arrangement in DRS 10) are well understood and either commercially available or can be constructed by one of ordinary skill in the art without undue experimentation. Thus, to reproduce them in detail herein would only serve to increase the complexity of the explanation of DRS 10 without adding to its clarity. Video front end 20 of DRS 10 will now be described beginning with sync separator 32 which will only be briefly described now and then in greater detail later in reference to the detailed diagram of FIG. 3.

Sync separator 32 of the video front end 20 receives an incoming or input composite video signal from video imager 12. Sync separator 32 strips or separates the synchronization levels from the input video signal and reproduces the sync signal components, i.e. vertical blanking, horizontal blanking and composite blanking, even field and odd field markers, on separate output channels 40. These sync signal components are closely locked in phase to the input video signal and output on the output channels 40 to memory controller 28 and header generator 36 for synchronizing operation of these components with A/D converter 34. Sync separator 32 also generates a pixel clock to A/D converter 34 that is locked to the input video signal. The frequency of the pixel clock is adjustable for fixing the rate at which pixels are sampled.

A/D converter 34 of video front end 20 receives the input video signal from video imager 12 as well as the pixel clock generated by sync separator 32. The pixel clock is the sampling clock received and used by A/D converter 34 for digitizing the input video signal into 10 bit-wide pixels which are output on its output data channels 42. A/D converter 34 digitizes the video signal at each clock transition and produces a Data Ready signal on one of its outputs. A/D converter 34 can be implemented by a component available from supplier, Analog Devices, and identified by Type Number CAV-1040.

Header generator 36 of video front end 20 functions to generate labels to identify each pixel. These labels are in the form of header words, or headers with identification (ID) bits. Header generator 36 is connected to sync separator 32 by sync output channels 40 and receives the sync signal components therefrom and outputs the headers on its 10 bit-wide output bus 44. The major sections of the video image, i.e. each horizontal line and the start of the even and odd fields, which is derived from the sync signal components, are labelled with headers generated by header generator 36. Header generation is triggered by a falling edge on the composite blanking signal of the sync signal components.

Header generator 36 includes three counters (not shown) which generate: (1) the time of day, (2) the line number within a given field, and (3) the number of frames recorded since the last reset of the counters. The headers which indicate the top of the lines and fields are produced logically from the separated sync signal components. The RFI index is recorded in the headers so the relationship between frame number and time of day is established.

By way of example the information contained in the headers may be as follows:

|  | (MSB) Bits 22–11 | Bits 10–0 (LSB) |
|---|---|---|
|  | Horizontal Line Header - 44 Bits Total | |
| Word 1 | Horizontal Header | Horizontal Header |
| Word 2 | RFI Index | Line Number |
|  | Field Header - 88 Bits Total | |
| Word 1 | Field Header | Field Header |
| Word 2 | RFI Index | Line Number |
| Word 3 | Frame Number | Frame Number |
| Word 4 | Frame Number (4 bits) | Time of Day (16 bits) |

In this example the leading bits of the two 10 bit words of the header (or bit positions 22 and 11) are the identification (ID) bits. The first ID bit (or bit position 22) is used to identify pixel words versus header words. A "1" in the first ID bit indicates pixel words. A "0" in the first ID bit indicates header words. Thus, this first ID bit identifies the character of the word of the two 10 bit words of the header. The second ID bit (or bit position 11) is available for assigning some function to as may be required by a particular application of the present invention.

The various headers are defined as follows. The Horizontal Line Header is: 01 00100 00100 in binary. The equivalent Hexadecimal representation of this code is 0484. The Even Field Header is: 01 10010 10010 in binary. The equivalent Hex representation is 0652. The Odd Field Header is: 01 11000 11000 in binary. The equivalent Hex representation is 0718.

An example of the horizontal line header format as would be presented to the 22 bit input of the recorder 14 (and received from the 22 bit output) is as follows:

| Header Format | | Comments |
| --- | --- | --- |
| 1XXXXXXXXX | 1XXXXXXXXX | ;ID bit #1 = 1, pixel word |
| 1XXXXXXXXX | 1XXXXXXXXX | ;ID bit #1 = 1, pixel word |
| 00010000100 | 10010000100 | ;ID bit #1 = 0, header word |
| 00000000011 | 10000001110 | ;RFI Index and Line Number |
| 1XXXXXXXXX | 1XXXXXXXXX | ;ID bit #1 = 1, pixel word |
| 1XXXXXXXXX | 1XXXXXXXXX | ;ID bit #1 = 1, pixel word |
| An example of the even field header is as follows: | | |
| 1XXXXXXXXX | 1XXXXXXXXX | ;ID bit #1 = 1, pixel word |
| 1XXXXXXXXX | 1XXXXXXXXX | ;ID bit #1 = 1, pixel word |
| 01100011000 | 11100011000 | ;ID bit #1 = 0, header word |
| 00000000011 | 10000000000 | ;RFI Index and Line Number |
| 00000000000 | 10011010010 | ;Frame Number and Time of |
| 00100000101 | 10000100011 | ;(Contd) Day |
| 1XXXXXXXXX | 1XXXXXXXXX | ;ID bit #1 = 1, pixel word |
| 1XXXXXXXXX | 1XXXXXXXXX | ;ID bit #1 = 1, pixel word |

The header format for the odd field is identical, with the substitution of the odd field header words.

Memory input latch 38 (MIL) of video front end 20 is a 44 bit sequential latch. MIL 38 is connected to output data channels 42 of A/D converter 34 and to output bus 44 of header generator 36. It uses the Data Ready signal to latch-in sequentially the digital information in four 10 bit pixels from A/D converter 34 at the A/D converter rate and formats it into 44 bit words which are compatible with memories 22 and 24. When latch 38 is full (4 pixels), it issues a Word Ready signal on one of its outputs which initiates a memory write cycle, causing the 44 bit word to be written to one of memory units 22 or 24 via memory input interface bus 26. The headers are clocked into MIL 38 at the top of each new line and field by a Header Ready signal from header generator 36 to MIL 38. A counter in MIL 38 is reset just before the header is generated so that the header is clocked into MIL 38 starting at the leftmost location therein. Thus, MIL 38 functions to latch the digital pixels into 44 bit memory words and clock these into memory, in parallel with the ID bits, and labelled by the headers.

Figure 4:
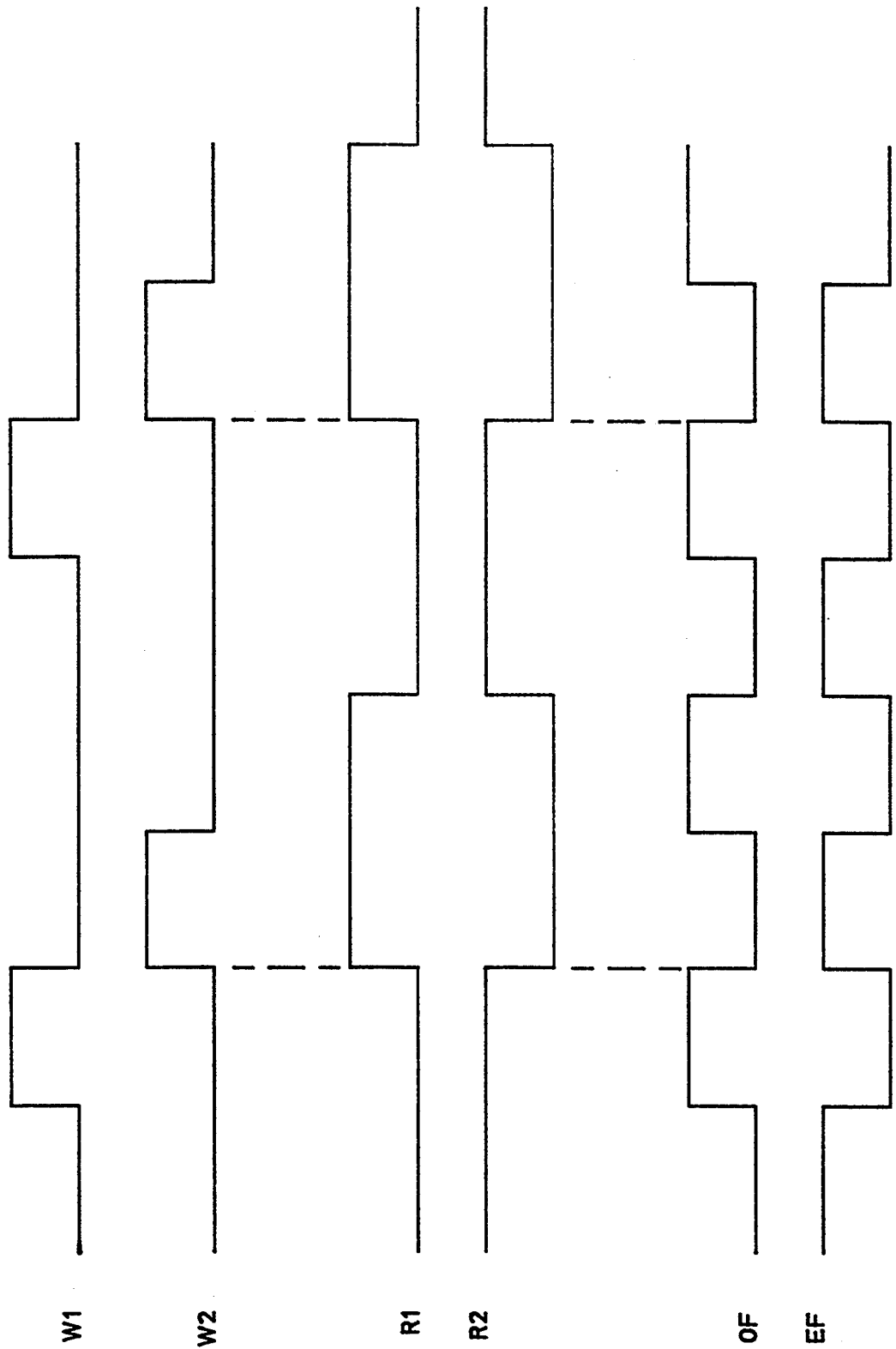
FIG. 4 is a waveform timing diagram of input and output signals of a memory controller of the digital recording system of FIGS. 1 and 2.

Memory controller 28 of DRS 10 controls operation of memory units 22 and 24 for each capturing one field of the video image. A waveform diagram of input and output signals of memory controller 28 is illustrated in FIG. 4. Memory controller 28 is connected to sync separator 32 by synch output channels 40 and receives the sync signal components therefrom and decodes the RFI setting on RFI selector 29. RFI selector 29 is a rotary switch, such as a conventional 4-bit digital thumbwheel device, mounted on the front panel of DRS 10. The desired RFI is programmed by rotating the thumbwheel (not shown) of RFI selector 29 to the desired setting.

Memory controller 28 receives five input signals from sync separator 32: clock, horizontal blanking, odd field, even field, and odd field trigger (only odd field and even field input signals OF and EF are illustrated in FIG. 4). From these five input signals, memory controller 28 generates Write and Read signals, W1, W2 and R1, R2, on its output bus 46 which determine the intervals for the memory write and memory read cycles, for each memory unit. The Read and Write signals are used to control input and output interface buses 26 and 28 for each of memory units 22 and 24. The two memory units 22 and 24 are operated in an alternating, ping-pong mode, so that one memory unit will be writing its contents to tape while the other is reading data from MIL 38. By memory controller 28 alternating their operations, memory Units 22 and 24 will provide a continuous, uninterrupted stream of data to recorder 14.

More particularly, memory controller 28 is initially triggered by the odd field trigger signal which marks the beginning of each odd field. Write signal W1 becomes high at this transition and goes low at the end of odd field signal OF. Write signal W2 becomes high during the following even field signal EF. Both write signals W1 and W2 then remain low during successive frames until the number of frames set by the RFI have occurred, whereupon the memory-write cycle of write signals W1 and W2 is repeated. Read signal R2 becomes high at the low-to-high transition of write signal W1, and remains high for exactly one-half of the RFI interval. Read signal R2 goes low, and read signal R1 goes high exactly halfway through the RFI interval. This memory-read cycle repeats every RFI interval also. The waveform timing diagram of this sequence for RFI=2 is shown in FIG. 4. Write signals W1 and W2 and read signals R1 and R2 are used to regulate memory interface input and output buses 26 and 30 to clock data into and out of memory units 22 and 24 and define intervals during which memory refresh cycles are initiated.

The RFI setting selected using RFI selector 29 and decoded by memory controller 28 determines the number of frames that are skipped (not recorded) between each memory-write cycle. The minimum RFI settings and the selectable RFI ranges for the different lines per frame formats which were mentioned earlier are defined as follows. The rotary switch of the RFI selector 29 is used to preset the RFI setting. The actual RFI setting determined by the switch setting read from the front panel of DRS 10 may be decoded by use of the following formula: $RFI=(P)(2^s)$, where P is the preset factor and s is the switch setting. The preset factors are the minimum RFIs allowed for given formats: 1 for 525 lines per frame imagers; 2 for 875 lines per frame imagers; and 3 for 1024 lines per frame imagers. Thus, for settings s from 0 to 7 where the format is 875 lines per frame, the selectable RFI range is: 2,4,8, . . . , 256.

Memory input/output interface buses 26 and 30 control the I/O data flow to and from the memory units. The Read and Write signals logically select the particular memory unit to be written to, and read from. Memory input interface bus 26 is a 44 bit latch, with two 44 bit 3-state buffers for input bus control. Four 10 bit pixels from A/D converter 34 are clocked sequentially into the latch at the A/D rate via an output bus 48 of MIL 38. When the latch is full the 44 bit word is written to one of the memory units. Each of the 3-state buffers is connected to an I/O channel in one of memory units 22 and 24. The 3-state buffers can be implemented by components available from supplier, Texas Instruments, and identified by Type Number 74LS365. Memory input interface bus 26 also receives Read and Write signals R1, R2 and W1, W2 from memory controller 28 via its output bus 46. One of the 3-state buffers of memory input interface bus 26 is enabled by the W1 or W2 signals from memory controller 28, thereby selecting one memory unit to which data is written.

The memory output interface bus 30 is a 44 bit latch and a 44 bit two-way multiplexer for output bus control. The two-way multiplexer can be implemented by a component available from supplier, Texas Instruments, and identified by Type Number 74LS257. The two-to-one multiplexer separates each 44 bit memory word into two 22 bit words that are compatible with the tape recorder 14 for recording on tape. The memory unit to be read from is selected by the R1 signal. The memory words are latched upon emergence from the memory unit and then multiplexed so that the 44 bit word becomes two sequential 22 bit words on output. A signal that indicates valid data can also be employed here.

The memory units 22 and 24 are dynamic first-in-first-out (FIFO) memories which temporarily store the video images. The total memory size is 512K words per memory, where each word is 11 bits wide. The combination of the two memories has sufficient size to store a full 1024×1024 pixel frame. The memories are addressed by memory address generators 50 and 52 in the form of two 24 bit counter banks which provide the memory locations for writing and reading data to and from the memory units. The memories are refreshed by memory refresh generators 54 and 56 during idle periods of the memory I/O.

Memory addressing on input is clocked by the Word Ready signal originating from MIL 38. Memory addressing on output is clocked by an Outclk signal from the refresh generators 50 and 52 that is set at a rate that will address one entire frame within the output time set by the memory read cycles. The minimum Outclock rate for three line rates are: (1) for 525 lines per frame and RFI of 1 minimum, the minimum Outclk frequency is 3.572 MHz; (2) for 875 lines per frame and RFI of 3 minimum, the minimum Outclk frequency is 3.292 MHz; and (3) for 1024 lines per frame and RFI of 4 minimum, the minimum Outclk frequency is 3.371 MHz. These are the slowest rates that can be used on output. The minimum RFI is preset for the selected line rate by setting the rotary switch of RFI select 29.

To recapitulate, the purpose of using memory units 22 and 24 is to slow the data transfer rate to the digital recorder 14, provide an uninterrupted output of data to the recorder, and to provide a convenient means of formatting the data. Memory units 22 and 24 delay the video data by the following scheme: when memory controller 28 triggers a memory write operation the video data in the even field is clocked into one memory unit. At the start of the odd field the memory input latch bus and the memory write clock is switched so that the odd field is written into the other memory unit. During the writing of the odd field in the other memory unit, the one memory unit outputs its contents data to the tape recorder. The rate that the memory outputs data is determined by the RFI selected. When the one memory unit finishes its output of the even field, the other memory unit starts to output the odd field. The one memory unit is idle until the number of frames specified by RFI have passed. It then inputs the even field of the next frame. When the odd field of that frame occurs, the other memory unit has finished outputting data, paused until the RFI-specified number of frames have passed, and is ready to capture the odd field repeating the cycle.

As mentioned earlier, the RFI of DRS 10 is variable and user selected by adjusting the rotary switch of RFI selector 29. The smallest RFI which can be selected is determined by the video bandwidth: for 525 lines per frame format with a video bandwidth of 5 MHz, the minimum RFI is 1, whereas for 1024 lines per frame format with a video bandwidth of 18 MHz, the minimum RFI is 3. As a rule of thumb, selection of a small RFI is desired for rapidly changing scenes, whereas selection of a large RFI is desired for static scenes to conserve tape. The time interval between the recorded frames can be lengthened by increasing the RFI. The highest RFI for the 525 lines per frame format will produce an 8.6 second interval between recorded frames. The highest RFI for the 1024 lines per frame format will produce a 26.1 second interval. A 16 inch reel of tape on an HBR-3000i recorder will last approximately 22 hours at the highest RFI.

Figure 3:
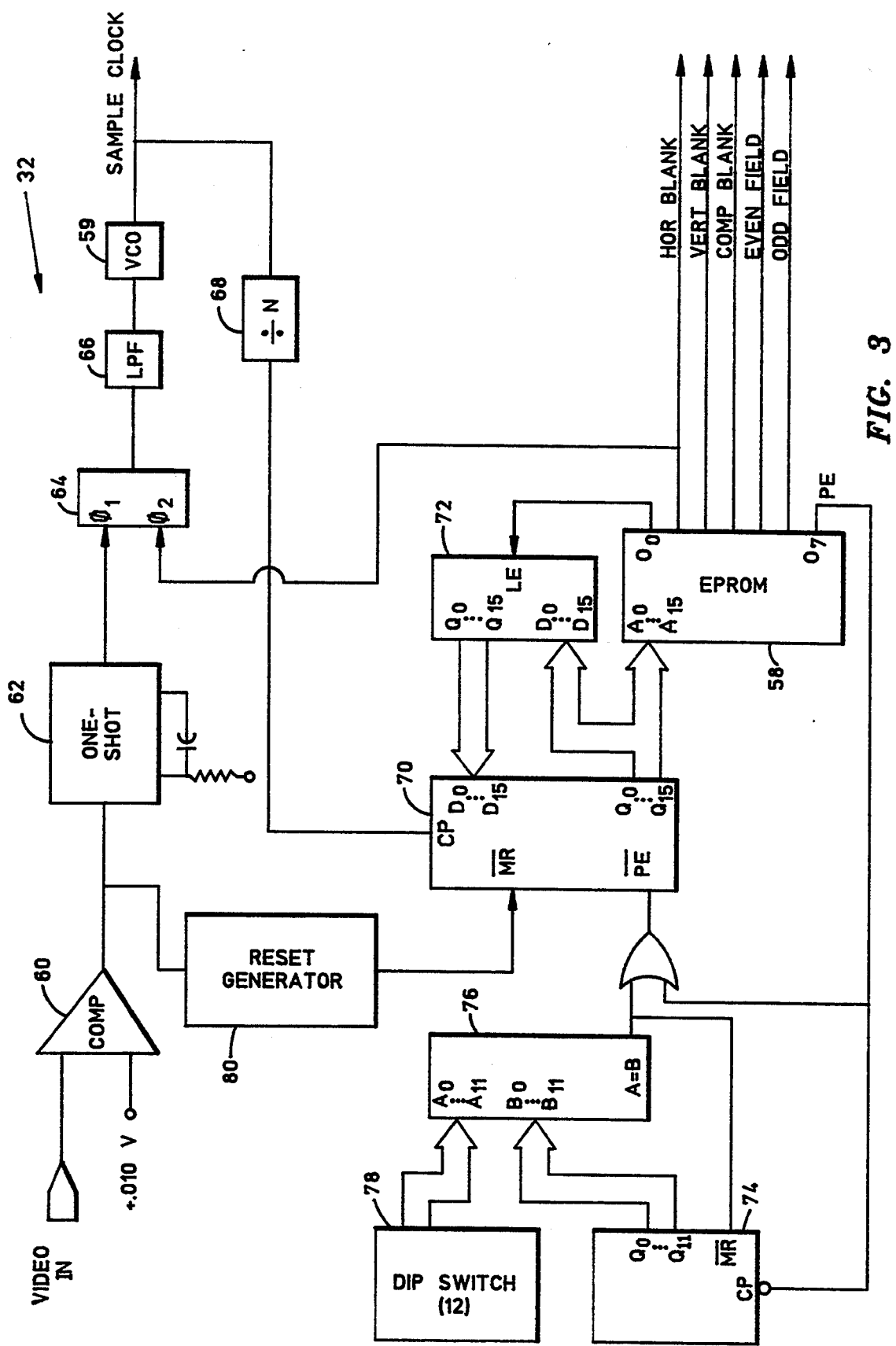
FIG. 3 is a detailed block diagram of a sync separator component of the digital recording system of FIGS. 1 and 2.

Referring finally to FIG. 3, there is illustrated, in a detailed diagram sync separator 32 of DRS 10. Sync separator 32 is designed to accommodate a broad variety of video formats. To change from one video source to another requires a few simple adjustments to the circuit, and the reprogramming of an erasable programmable read-only memory (EPROM) 58 employed therein.

The circuit making up sync separator 32 is designed around EPROM 58. EPROM 58 is programmed with the equivalent of a single video frame of sync information. The various sync signal components are separated into different channels by programming each sync component in one bit of EPROM 58. When the information is clocked from EPROM 58, the sync components will appear simultaneously on the different bits of the 8 bit memory word on sync channels 40 (FIG. 2A), or outputs $O_0$ to $O_7$ of EPROM 58.

The peripheral circuitry around the EPROM 58 generates the clocking, resetting and latching of the EPROM data. The circuit uses a phase locked loop (PLL) for locking the sync components from EPROM 58 to the incoming video signal. The clock signal generated by the PLL voltage controlled oscillator (VCO) 59 is used as the video pixel clock.

The circuit may be designed with TTL and ECL logic. It may be designed to operate with power supplies of +5.0 V, −5.2 V, and −2.0 V. The sync output signal components may be TTL compatible and the clock output signal may be ECL compatible.

EPROM 58 is programmed with an EPROM programmer interfaced to an IBM AT computer. The EPROM coding is generated with a BASIC program. The BASIC program inputs the sync timing and line rate of the video source, and from this generates the information for EPROM 58.

As shown in FIG. 3, sync separator 32 includes high speed comparator 60, non-retriggerable one-shot multivibrator 62, and phase comparator 64. Comparator 60, multivibrator 62 and comparator 64 can be implemented by components available from supplier, Motorola, and identified respectively by Type Numbers MC1650, MC101198 and MC4344. The phase locked loop (PLL) is composed of VCO 60, phase comparator 64 and low pass filter 66 disposed between them. Other components of sync separator 32 are divider 68, address counter 70, latch 72, 12-bit counter 74, comparator 76, dip switches 78 and reset generator 80. Divider 68 can be implemented by a component available from supplier, Motorola, and identified by Type Number MC10136. Counter 70, latch 72, counter 74, and comparator 76 can be implemented by components available from supplier, Texas Instruments, and identified by respective Type Numbers 74LS161, 74LS374, 74LS163 and 9344.

The incoming video signal is received by high speed comparator 60. The comparator output is the composite blanking signal from the video source. This signal is filtered with one-shot multivibrator 62 to remove the serration and marking pulses from the vertical blanking interval, and produces a continuous stream of pulses at the horizontal line rate of imager 12. This signal is translated from ECL to TTL logic and is one of the input signals to phase comparator 64 of the PLL. The second input to phase comparator 64 of the PLL is the horizontal blanking signal from EPROM 58. The output of phase comparator 64 controls ECL VCO 59. The VCO frequency is divided by 4, 8 or 16 at divider 68 and is the clock for EPROM address counter 70. When the loop is in lock the EPROM horizontal line rate will match the primary video horizontal rate.

Address counter 70 controls the flow of information from EPROM 58. There are two output channels, $O_0$ and $O_7$, from EPROM 58 which are programmed with signals to control counter 70. The LE signal from output channel $O_0$ causes the present EPROM address to be latched by latch 72 and held. The latched address is present at the counter preset inputs D. The PE signal from output channel $O_7$ of EPROM 58 causes the counter 70 to load the latched address and continue counting from there.

The PE signal also increments 12-bit counter 74. The output of counter 74 and settings of DIP switch 78 are registered on inputs $A_0$–$A_{11}$ and $B_0$–$B_{11}$ of comparator 76 and compared. When the two are equal (A=B), the PE signal is overridden and EPROM address counter 70 counts past the PE signal without presetting. The PE signal is programmed to occur at the end of the active horizontal lines. DIP switches 78 are set with the number of active horizontal lines per field, which causes that number of repetitions of the active horizontal line. This system of resetting is used, rather than continuously programing the horizontal lines, because the EPROM capacity is not large enough to hold a full video field. With this scheme the active horizontal line needs to be programmed only once per field. The vertical blanking intervals are non-repetitious and are programmed in full.

EPROM address counter 70 is reset to location 0000H once per frame by reset generator 80. This circuit is a logical filter which passes only the first serration pulse of the odd field vertical blanking interval from the primary video signal. EPROM 58 is programmed to match the primary sync at this point. This circuit ensures that the primary sync and the programmed sync signals are exactly locked in phase.

The pixel clock rate is determined by dividing the active horizontal line time of the video source by the number of samples desired from each horizontal line. This time interval is multiplied by four or eight, depending on the video source. EPROM 58 is programmed with the sync information spaced at intervals such that when the information is read out of EPROM 58 at the specified time interval it will exactly match the primary video rate.

Sync separator 32 is useful as a variable video format gen-lock and digitizing clock generator. The video circuit of the separator 32 is easily matched to any video source by replacing the VCO tank inductor, changing the divide by N jumper setting, setting DIP switches 78 to the number of active horizontal lines, and reprogramming EPROM 58. These modifications can be made for a new line rate in only a few hours, and once the EPROM programming for a given video source is established the changes can be made within a few minutes. This represents a considerable savings in time when converting a video digitizer to a new video format.

The circuit of sync separator 32 may, by way of example, be designed partially in ECL logic to allow a high speed pixel clock operating at speeds up to 40 MHz to be generated on the board without creating a large amount of digital noise in the rest of the circuitry. Also, many high speed A/D converters require an ECL clock signal. Further, this circuit provides a programmable gen-lock circuit with a stable pixel clock. The clock rate can be programmed to any frequency in the range of 3–50 MHz. This feature is convenient for digitizing images for various display aspects; i.e. 1:1, 4:3, etc. This easy variability is a new feature in gen-lock circuits.

It should be understood that DRS 10 disclosed herein is independent of the tape recorder that is used with it. It can be adapted to operate with various digital recorders, such as optical disk recorders, digital helical scan recorders.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely exemplary embodiments thereof.

Having thus described the invention, what is claimed is:

1. A digital recording system for interfacing a video imager which generates information at a given generation rate with a recorder which records the video information at a record rate equal to or less than said given generation rate, said digital recording system comprising:
    (a) means for storing video information;
    (b) means for receiving video information from the video imager and processing the video information to produce frames of formatted video information capable of storage in said storing means;
    (c) means coupled to said video information processing means for writing the frames of formatted video information from said processing means to said storing means;
    (d) means coupled to said video information storing means for reading the frames of formatted video from said storing means to the recorder; and
    (e) means coupled to said writing means and said reading means for controlling the operation of said writing means to cause writing of each frame of the formatted video information to said storing means at a write rate equal to said given generation rate of the video imager and for variably controlling the operation of said reading means to selectively skip no frames, one frame or more than one frame of the frames generated by said imager in response to a first input, a second input, or a third input, respectively, such that said skipped frames are not written to said recorder to cause said reading means to cause reading of specified ones of the frames of formatted video information from said storing means to said recorder at a rate equal to or below said record rate.

2. The system of claim 1 wherein said controlling means is operable to cause said reading means to read the frames between any frame that are skipped.

3. The system of claim 1 wherein said processing means includes:
means for receiving video information from the video imager and separating sync signals from a video signal.

4. The system of claim 3 wherein said processing means also includes:
means for receiving the video information from the video imager and converting the video information into frames of digitized video information.

5. The system of claim 4 wherein said processing means further includes:
means coupled to said separating means and said converting means for receiving the sync signals and generating headers corresponding to each frame of digitized video information.

6. The system of claim 5 wherein said processing means still further includes:
means coupled to said converting means and said header generating means for receiving the frames of digitized video information and the headers corresponding thereto and combining the same to produce the frames of formatted video information for storing in said storing means.

7. The system of claim 3 wherein said controlling means is also coupled to said separating means for receiving the sync signals and processing the same to produce write and read signals for controlling writing and reading of the formatted video information to and from said storing means by said writing means and reading means.

8. The system of claim 1 wherein said storing means includes a pair of memory units for storing the frames of formatted video information.

9. The system of claim 8 wherein said writing means and reading means are operated by said controlling means such that said writing means causes the writing of frames of formatted video information from said processing means to one of said memory units of said storing means concurrently as said reading means causes the reading of selected frames of formatted video information from the other of said memory units of said storing means to the recorder.

10. The recording system of claim 1 wherein said controlling means includes a switch having at least first, second, and third positions and wherein said first, second, and third inputs are inputs to said switch.

11. The recording system of claim 10 wherein said switch includes a thumbwheel and said inputs to said switch comprise rotations of said thumbwheel.

12. A digital recording system for interfacing a video imager which generates video information at a given generation rate with a recorder which records video information at a record rate which is less than or equal to said given generation rate, said digital recording system comprising:
(a) a pair of memory units for storing video information;

(b) means for receiving video information from the video imager and processing the video information to produce frames of formatted video information capable of storage in said memory units;
(c) means for receiving video information from the video imager and separation sync signals from a video signal;
(d) means coupled to said sync signal separating means for receiving sync signals and generating write and read signals capable of controlling writing and reading of the frames of formatted video information to and from said memory units;
(e) means coupled to said write and read signal generating means, said processing means and said memory units for receiving said write and read signals and said frames of formatted video information and writing to said memory units the frames of formatted video information at a write rate equal to said given generation rate of the video imager; and
(f) means coupled to said write and read signal generating means, said processing means and said memory units for variably controlling the operation of said reading means to selectively skip no frames, one frame or more than one frame of the frames generated by said imager in response to a first input, a second input, or a third input, respectively, such that said skipped frames are not written to said recorder to cause reading of specified ones of the frames of formatted video information from said storing means to said recorder at a rate equal to or below said record rate.

13. The system of claim 12 wherein said write and read signal generating means is operable to cause said reading means to read the frames between any frames that are skipped.

14. The system of claim 13 wherein said processing means includes:
means for receiving the video information from the video imager and converting the video information into frames of digitized video information.

15. The system of claim 14 wherein said processing means further includes:
means for receiving the sync signals and generating headers corresponding to each frame of digitized video information.

16. The system of claim 15 wherein said processing means also includes:
means coupled to said converting means and said header generating means for receiving the frames of digitized video information and the headers corresponding thereto and combining the same to produce the frames of formatted video information for storing in said memory units.

17. The system of claim 13 wherein said writing means and reading means are operated by said write and read signal generating means such that said writing means causes the writing of frames of formatted video information from said processing means to one of said memory units concurrently as said reading means causes the reading of selected frames of formatted video information from the other of said memory units to the recorder.

18. The recording system of claim 12 wherein said controlling means includes a switch having at least first, second, and third positions and wherein said first, second, and thrid inputs are inputs to said switch.

19. The recording system of claim 18 wherein said switch includes a thumbwheel and said inputs to said switch comprise rotations of said thumbwheel.

* * * * *